(12) United States Patent
Berger et al.

(10) Patent No.: US 12,442,867 B2
(45) Date of Patent: Oct. 14, 2025

(54) ASCERTAINING THE STATE OF HEALTH OF A VEHICLE BATTERY

(71) Applicant: AVILOO GmbH, Weiner Neudorf (AT)

(72) Inventors: Wolfgang Berger, Biedermannsdorf (AT); Nikolaus Mayerhofer, Sulz im Wienerwald (AT)

(73) Assignee: AVILOO GMBH, Weiner Neudorf (AT)

( * ) Notice: Subject to any disclaimer, the term of this patent is extended or adjusted under 35 U.S.C. 154(b) by 39 days.

(21) Appl. No.: 18/556,267

(22) PCT Filed: Mar. 10, 2022

(86) PCT No.: PCT/AT2022/060068
§ 371 (c)(1),
(2) Date: Oct. 19, 2023

(87) PCT Pub. No.: WO2022/221891
PCT Pub. Date: Oct. 27, 2022

(65) Prior Publication Data
US 2024/0361397 A1    Oct. 31, 2024

(30) Foreign Application Priority Data
Apr. 20, 2021   (AT) ............... A50292/2021

(51) Int. Cl.
*G01R 31/392*   (2019.01)
*B60L 58/12*    (2019.01)
(Continued)

(52) U.S. Cl.
CPC ............ *G01R 31/392* (2019.01); *B60L 58/12* (2019.02); *B60L 58/16* (2019.02); *G01R 31/367* (2019.01);
(Continued)

(58) Field of Classification Search
None
See application file for complete search history.

(56) References Cited

U.S. PATENT DOCUMENTS 10,641,836 B1 * 5/2020 Hou .................... G01R 31/392
10,942,223 B1 * 3/2021 Malloy ............... H01M 10/425
(Continued)

FOREIGN PATENT DOCUMENTS

DE         102019111979          11/2020

OTHER PUBLICATIONS

International Search Report and Written Opinion dated Jun. 10, 2022 for International Patent App. No. PCT/AT2022/060068.
Machine Translation of DE102019111979.

*Primary Examiner* — Abdhesh K Jha
(74) *Attorney, Agent, or Firm* — Husch Blackwell LLP

(57) ABSTRACT

A method for ascertaining the state of health of the vehicle battery of an electric vehicle includes charging the vehicle battery and ascertaining specified battery parameters during the charging process, and calculating the state of health of the vehicle battery using a vehicle-specific battery model on the basis of the transmitted battery parameters. A basic battery model, which is based on the vehicle battery type, in the form of an electric equivalent circuit model is first used as the vehicle-specific battery model, wherein the internal resistance and RC elements are ascertained as a function of the cell temperature and the charge state, an open circuit voltage characteristic is ascertained as a function of the charge state, and the cell temperature is ascertained using a thermal model on the basis of the measured battery pack current, EC parameters, the battery module temperature, and the ambient temperature.

13 Claims, 4 Drawing Sheets

(51) Int. Cl.
*B60L 58/16* (2019.01)
*G01R 31/367* (2019.01)
*G01R 31/388* (2019.01)

(52) U.S. Cl.
CPC ...... *G01R 31/388* (2019.01); *B60L 2240/545* (2013.01); *B60L 2240/547* (2013.01); *B60L 2240/549* (2013.01); *B60L 2240/70* (2013.01)

(56) References Cited

U.S. PATENT DOCUMENTS

| | | | |
|---|---|---|---|
| 11,214,150 B2* | 1/2022 | Gelso | B60L 3/12 |
| 2016/0349330 A1* | 12/2016 | Barfield, Jr. | G01R 31/389 |
| 2018/0284195 A1* | 10/2018 | K | H01M 10/052 |
| 2020/0269722 A1 | 8/2020 | Aykol | |
| 2024/0385253 A1* | 11/2024 | Wang | G01R 31/396 |

* cited by examiner

ASCERTAINING THE STATE OF HEALTH OF A VEHICLE BATTERY

CROSS REFERENCE

This application is a U.S. National Phase Application of International Application No. PCT/AT2022/060068 filed on 10 Mar. 2022, which claims priority to Austrian Application No. A50292/2021 filed on 20 Apr. 2021, the disclosures of each of which are hereby incorporated by reference herein in their entireties.

TECHNICAL FIELD

The present disclosure relates to a method and a device for determining the vehicle battery's state of health in an electric vehicle or hybrid vehicle.

BACKGROUND

The importance of battery operated vehicle such as automobiles or shuttles, as well as stationary battery storage systems, has grown in the context of the increasing use of renewable energy sources and the reduction in $CO_2$ emissions.

One of the most important characteristics of a battery is its state of health (SoH). Because of the complex chemical reactions that take place in the battery, the available capacity decreases over time, and its state of health diminishes. The state of health is determined on the basis of numerous parameters that change over the course of the battery's lifetime. These parameters include its capacity, power, EC parameters and thermal parameters.

Batteries usually have their own battery management system that is integrated in the battery and keeps the battery operating reliably. These battery management systems can detect individual cell voltages, the battery pack current, or battery module temperatures, for example. Other functions of these battery management systems include estimating the state of charge (SoC) and the state of health.

Battery management systems from the prior art usually make use of an inexpensive, simple microcontroller. For this reason, the algorithms used in the battery management system to calculate the state of health and the state of charge must make efficient use of the available computing capacity, and are therefore prone to error. The battery's state of charge is usually calculated in existing battery management systems using a Coulomb counter combined with the open-circuit voltage for the battery and is therefore based on laboratory data and algorithms stored in the battery management system. The state of health is usually calculated on the basis of predefined aging models. The state of health calculated for a specific battery on the basis of predefined data and models is therefore at best an imprecise estimation of the actual state of health, because it cannot be tailored to a specific battery and/or type of vehicle.

EP 3224632 B1 discloses a battery management system that has both internal and external subsystems that are inside and outside of the vehicle. The external subsystem can store date from the internal subsystem and create a battery model on the basis thereof, with which parameters for simple battery models can then be depicted. These parameters are then sent to the subsystem in the vehicle, which then selects a simple battery model with which the battery management system calculates the battery status. This approach also only results in an approximate estimation of the battery status, because the limited storage and computing power of the battery management system only allows for the use of a simplified battery model in the calculations made in the vehicle.

The object of the present disclosure is to therefore resolve these problems and create a method and a device with which the vehicle battery's state of health in an electric or hybrid vehicle can be determined precisely, tailored to the specific vehicle battery.

SUMMARY

These problems are solved by the present disclosure with a method for determining the vehicle battery's state of health in an electric or hybrid vehicle in accordance with the present disclosure. This method may comprise the following steps:

connecting the battery to a load and determining values for predefined parameters with the battery management system in the vehicle while the battery is in use, in particular the battery pack voltage, battery pack current, cell voltage, battery module temperature and/or state of charge, sending these parameter values to an external data storage unit outside the vehicle via a data transfer unit that can be plugged into the diagnosis socket in the vehicle, preferably in realtime, and calculating the vehicle battery's state of health on a server connected to the data storage unit for data transfer, taking the specific battery model for the vehicle into account, on the basis of the battery parameter values that were obtained.

Methods of the present disclosure have the advantage that a precise estimation of the vehicle battery's state of health can be obtained for on a specific battery model, which tailored to the vehicle battery or vehicle in question. Because the calculation takes place on an external server outside the vehicle, there is no need for a simplified battery model, as was the case when the calculations were made in the battery management system within the vehicle with its limited computing capacity and storage space. Instead, the battery model in the external server can be as complex as necessary to obtain a more precise calculation of the battery's state of health, taking a number of parameters, current and past data from the vehicle battery, as well as any available laboratory data and data from other vehicle batteries into account.

A particularly versatile and simple basic battery model can be created, which can be adapted to various types of vehicles and battery aging states, as well as specific environmental conditions, when a basic battery model in the form of an equivalent circuit model that is based on the type of vehicle battery is initially used for the vehicle-specific battery model, in which the basic battery model comprises a power source, internal resistance, and a number of RC circuits, specifically two, in which the internal resistance and RC circuits reflect the cell temperature and the state of charge, an open-circuit voltage is a function of the state of charge, and the cell temperature is determined with a thermal model based on the measured battery pack current, EC parameters, in particular those for the equivalent circuit model, the battery module temperature, and the ambient temperature.

An RC circuit in the context of the present disclosure is a circuit comprising a resistor and a capacitor.

The values of the battery parameters for the basic battery model can be quickly, easily, and reliably obtained when the battery parameters for the basic battery module are assigned values based on measurements of the individual cells in the vehicle battery, in particular the measurements of the voltages and currents in individual cells, in which the open-circuit voltage is determined for at least one cell, preferably numerous cells, which is then used as the basis for estimating the open-circuit voltage for the vehicle battery.

A particularly accurate vehicle-specific battery model can be obtained with regard to the aging process, individual quality, and charging behavior of the vehicle battery when the values for the parameters of the basic battery model are adjusted to the battery parameters obtained while the battery is connected to a load, by which means the vehicle-specific battery model is created.

A further improvement with regard to tailoring the vehicle-specific battery model to the actual vehicle battery can be obtained when the values assigned to the parameters for the basic battery model are adjusted on the basis of the cell temperatures and/or state of charge and/or aging state of the battery determined while the battery is connected to a load.

A particularly reliable adjustment of the parameter values for the basic battery model can be obtained when the vehicle battery is connected to a load, i.e. while the vehicle is being test driven, valid values are obtained for the parameters of the basic battery model relating to the state of charge and cell temperature during the test drive, and the values obtained in this manner are standardized to a predefined temperature, in particular 25° C., based on the values determined according to the present disclosure on the basis of the measurements for individual cells in the vehicle battery, and extrapolated to obtain the vehicle-specific battery model on the basis of a predefined charge range, in particular from 0-100%.

The precision of the vehicle-specific battery model with regard to the actual vehicle battery can be further improved when the internal resistances resulting from the wiring and/or soldering between the individual cells in the vehicle battery are taken into account in the basic battery model and/or in the vehicle-specific battery model.

It is possible to estimate the distance a vehicle can travel on the basis of the battery's current state of charge with the method according to the present disclosure if the vehicle-specific battery model has been used in a testing cycle, in particular a WLTP cycle, to estimate the distance a vehicle can travel at the vehicle battery's current state of health, in particular in which the vehicle-specific battery model is supplied with power in accordance with a predefined current profile.

One possibility for testing the vehicle battery when connected to a load in the framework of the method of the present disclosure can be obtained by driving the vehicle with an initially fully charged battery until it is drained to the fully discharged level.

Another possibility for testing the vehicle battery in the framework of the method according to the present disclosure with which the testing period can be substantially shortened involves connecting the battery to a load after it has been charged in accordance with a predefined charging model, and/or partially discharging the battery in a test drive, in which the battery parameters are extrapolated to the fully discharged state during the test drive based on past data and/or laboratory data.

Another means of testing the vehicle battery in the framework of the method of the present disclosure in which the testing time can be substantially shortened and the test drive can be eliminated can be obtained by calculating the open-circuit voltage in the vehicle battery using EC parameters based on the vehicle-specific battery model, which has been discharged to a specific testing level, in which the relationship between the open-circuit voltage and the state of charge for individual cells in the vehicle battery, in particular the open-circuit voltage/state of charge curve, is predefined, the vehicle battery's current state of charge is determined on the basis of the open-circuit voltage, and the vehicle battery's state of health is determined using a Coulomb counter and the change in the state of charge is extrapolated to the fully discharged or fully charged state.

The vehicle battery's state of health can be calculated offline at a later time, i.e. after the vehicle battery is no longer connected to a load, if the battery parameter values measured while the battery was in use have already been sent to the data storage unit.

In order to also be able to calculate the state of health in vehicles or types of vehicles with data regarding the battery parameters that varies significantly, the battery parameter values can undergo various processing steps after being sent to the data storage unit, such as a smoothing, and/or synchronization, and/or resampling.

Another object of the present disclosure is to also create an system for determining the vehicle battery's state of health in an electric or hybrid vehicle, which can be designed in particular to execute the method of the present disclosure. This problem is solved with one or more systems according to embodiments of the present disclosure. The systems may comprise the following components:

- a separate data storage unit, in particular outside the vehicle,
- a data transfer unit that can be connected to the diagnosis socket in the vehicle, with which battery parameter values determined by the battery management system while the vehicle battery is connected to a load can be sent to the data storage unit, and
- a server connected to the data storage unit for data communication, with which the vehicle battery's state of health can be calculated on the basis of the battery parameter values, taking the vehicle-specific battery model into account, in which the server is configured to select the battery model on the basis of the type of vehicle battery in question.

The present disclosure also relates to a data transfer unit for a system for determining a vehicle battery's state of health in an electric or hybrid vehicle, in particular for the system according to the present disclosure. This data transfer unit can be plugged into a diagnosis socket in the vehicle, and is configured to send battery parameter values obtained by the battery management system while the vehicle battery is in use to a data storage unit.

These embodiments are merely illustrative aspects of the innumerable aspects associated with the present disclosure and should not be deemed as limiting in any manner. These and other embodiment, aspects, features and advantages of the present disclosure will become apparent from the following detailed description when taken in conjunction with the referenced figures.

BRIEF DESCRIPTION OF FIGURES

Further features and advantages of the present disclosure will become more apparent from the description of preferred but non-exclusive embodiments according to the present disclosure, illustrated by way of non-limiting examples in the accompanying drawings, in which.

DETAILED DESCRIPTION

Figure 1:
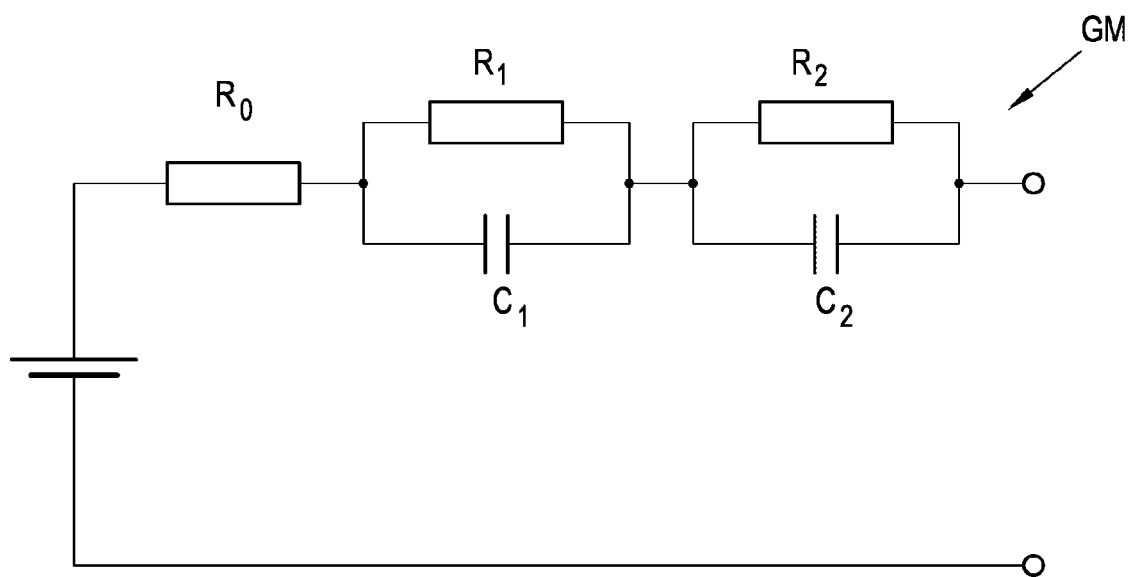
FIG. 1 shows an exemplary embodiment of an equivalent circuit in a basic battery model.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Because the various factors taken into account when describing a vehicle battery's state of health SoH of are complex, and usually involve non-linear relationships, which in turn are also dependent on numerous different parameters, a comprehensive database is necessary for creating an accurate vehicle battery model. Machine learning algorithms used to create battery models require a comprehensive database containing driving data from numerous vehicles of a specific type, obtained with vehicles that have been operated in numerous mileage ranges. This means that vehicles are needed that have been driven 0-10,000 km, 10,000-50,000 km, 50,000-100,000 km, etc. To make a reliable vehicle-specific battery model that remains unaffected by statistical outliers, numerous vehicles (e.g. 10) should be tested in each category. It is particularly difficult to find vehicles with high mileage (100,000 km or more) in the first few years after a new vehicle has been placed on the market.

Exemplary embodiments of the method and system according to the present disclosure for determining the vehicle battery's state of health SoH in an electric vehicle, as well as advantageous options, shall be described in detail below. These exemplary embodiments are not to be regarded as limiting, and it should be noted that the battery's state of health SoH in a battery electric vehicle (BEV) or a plug-in hybrid vehicle (PHEV), or any other battery system such as those used in shuttles and aircraft, as well as stationary power storage systems, can also be calculated with the method and system according to the present disclosure.

With the method according to the present disclosure for determining a vehicle battery's state of health, the battery is connected to a load and a series of predefined battery parameters are measured, preferably in realtime, while a model-based approach is used to calculate the state of health with a vehicle-specific battery model FM (which stands for the German word: Fahrzeugmodell; EN: vehicle model). The model-based approach is particularly advantageous when calculating the battery's state of health SoH in vehicles during the first five years, i.e. before they have been driven more than 100,000 km.

These parameters can include the battery pack voltage and battery pack current, and/or the state of charge, as well as the cell voltage, battery module temperature, and/or state of charge of individual cells in the battery. These parameters can be measured while the battery is in use, e.g. by the battery management system integrated in the vehicle battery.

System

The measured battery parameter values are subsequently sent to a data storage unit outside the vehicle, e.g. a cloud storage, which can take place nearly in realtime while the battery is connected to a load, or after the battery is disconnected and the battery parameters have been measured.

The vehicle battery's state of health SoH is then calculated on a server connected to the data storage unit, taking the vehicle-specific battery model into account and based on the battery parameter values that have been obtained. This calculation of the vehicle battery's state of health SoH can take place offline, e.g. after measuring the battery parameter values and sending this data to the data storage unit. It is also possible to combine the data storage unit and the server.

Calculation of the vehicle battery's state of health SoH on an external server outside the vehicle has substantial advantages because this allows for the battery management system to function with a simple microcontroller, while a complex calculation of the vehicle battery's state of health can still be based on a large number of factors. The algorithms necessary for calculating the battery's state of health are stored on the server, and all of the calculations are carried out on the server, so that it is not necessary to store anything or make any calculations in the battery management system's microcontroller. The server can also have a user interface with which a user can select various options.

The parameters measured while the battery is connected to a load can also be processed on the server and/or in the data storage unit. This processing is particularly advantageous because different vehicles and models may provide battery parameter data of different qualities. The quality of data from different vehicle and battery management system manufacturers differs with regard to the sampling rates and resolutions of the battery parameters. This is primarily because there are no established standards for battery data. In the framework of this processing, the statistical outliers can first be eliminated from the parameter values, before smoothing and/or synchronizing and/or resampling these values to obtain equidistant data distributions. These data processing steps are particularly advantageous with regard to being able to obtain vehicle-specific battery models for all types of vehicles regardless of data quality.

The calculation of the state of health can be continuously improved with this centralized data processing, analysis and algorithmic system, in particular with regard to precision and shortening testing times, because the raw data that is obtained, as well as the processed data, can be made permanently available, or stored, and subsequently used when calculating the state of health.

Because of the limited computing capacity of the microcontrollers normally used in battery management systems, it would be difficult or impossible to take a large number of factors into account, or to apply data processing steps to the battery parameter values that have been obtained, when calculating the state of health.

The battery parameter values can preferably be sent a data transfer unit that can be plugged into the diagnosis socket in the vehicle. This data transfer unit can be connected to the OBD2 port or the DoIP port (DoIP: Diagnostics over Internet Protocol) in the vehicle, or to some other CAN bus (e.g. for the drive train, the entertainment system, or the chassis) in the vehicle. All types of vehicles, e.g. passenger automobiles, trucks, boats, motorcycles and electric scooters, as well as stationary power storage units can be diagnosed therewith.

There are communication protocols for various types of vehicles stored in the data transfer unit with which it is possible to read the battery parameter values obtained from the battery management system and send them to the data storage unit via Wi-Fi, LTE, Bluetooth, or the ethernet, for example. A specific pathway can be selected for the application in question. As stated above, the battery parameter values measured by the battery management system can basically be sent in realtime, or in a buffered mode in which the measurement values are collected and stored temporarily, such that they are first sent after connecting to the internet.

It is also possible to send the parameter values obtained while the vehicle battery is connected to a load to the data storage unit by another means, which does not limit the calculation of the vehicle battery's state of health SoH with the method of the present disclosure in any way as long as the parameter values are measured while the battery is connected to a load.

Basic Battery Model GM:

To create the vehicle-specific battery model FM, a basic battery model GM is initially created, as shown in the first exemplary embodiment in FIG. 1, which is subsequently fine-tuned to the various types of vehicles to obtain the vehicle-specific battery model FM, taking into account the aging of the vehicle battery and to the type of vehicle and battery (see the schematic overview shown in FIG. 2).

The basic battery model GM in FIG. 1 is an equivalent circuit (EC) model, which defines the voltage of the vehicle battery in relation to the current and state of charge via an internal resistance $R_0$ and two RC circuits $RC_1$, $RC_2$.

This EC model is a complex mathematical definition of a battery in which the basic battery model GM can be the same for every vehicle, as can be seen in FIG. 1.

The internal resistance $R_0$ and the RC circuits $RC_1$, $RC_2$ reflect the cell temperatures and state of charge of the individual cells, the open-circuit voltage OCV is a function of the state of charge, and the cell temperature is calculated using a thermal model based on the measured battery pack current, the EC parameters, the battery module temperature and the ambient temperature. This shall be explained below in greater detail.

Identification of EC Parameters:

The EC parameters, i.e. the parameters for the equivalent circuit (EC) model, are identified using various least squares algorithms. The basis for the identification is the exact open-circuit voltage OCV. The EC parameters are subsequently identified on the basis of the voltage difference $U_{EC}$ between the battery voltage $U_{Batt}$ and the open-circuit voltage OCV:

$$U_{EC} = U_{Batt} - OCV$$

$U_{EC}$ is therefore composed of the voltage drops through the internal resistance and the two RC circuits:

$$U_{EC} = U_0 + U_{RC1} + U_{RC2}$$

The voltage drop at the $RC_1$ circuit is described after the z-transformation as $$u_{RC1}(k) = \frac{b_1}{z - a_1} * i(k)$$

with $$a_1 = e^{\frac{-Ts}{\tau_1}}$$
$$b_1 = R_1 * (1 - a_1)$$

where $\tau_1$ and $R_1$ represent the parameters for the RC circuit. The same is the case for the $RC_2$ circuit with $\tau_2$ and $R_2$.

The equation for the voltage $U_{EC}$ can then be derived as:

$$U_{EC}(k) = \left(R_0 + \frac{b_1}{z - a_1} + \frac{b_2}{z - a_2}\right) * i(k) + c_0$$

With the coefficients $$\theta_{d,0} = a_1 + a_2$$
$$\theta_{d,1} = a_1 * a_2$$
$$\theta_{n,1} = R_0$$
$$\theta_{n,1} = b_1 + b_2 - R_0 * (a_1 + a_2)$$
$$\theta_{n,0} = R_0 * a_1 * a_2 - a_2 * b_1 - a_1 * b_2$$

the system equations can be defined:

$$y(k) = z^2 U_{EC}(k)$$
$$\theta = [\theta_{d,0}, \theta_{d,1}, \theta_{n,2}, \theta_{n,1}, \theta_{n,0}, (1 - \theta_{d,0} - \theta_{d,1})c_0]^T$$

-continued
$$\phi(k) = [zU_{EC}(k), U_{EC}(k), z^2i(k), zi(k), i(k), 1]^T$$

which describe the voltage $U_{EC}$ via $$y(k) = \theta^T * \phi(k).$$

Using the known cost function for the least squares:

$$J = \sum [y(k) - \theta^T * \phi(k)]^2$$

And the inversion thereof, the parameter in $\theta$ can be obtained.

$$\theta = (\Phi^T * \Phi)^{-1} * \Phi^T * Y$$

Erroneous signals, noise or signal gaps can also be taken into account here, which could lead to instabilities in the identification algorithms.

Figure 3:
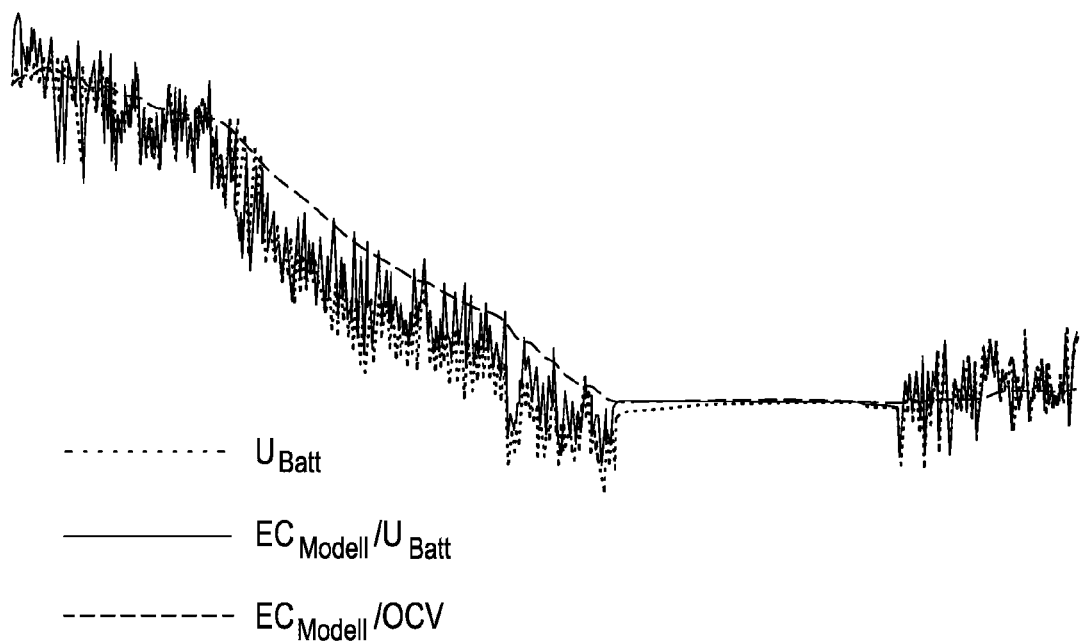
FIG. 3 shows a comparison of simulated and measured cell voltages during a driving cycle.

FIG. 3 shows a comparison of the simulated cell voltage $EC_{model}/U_{Batt}$ and the measured cell voltage $U_{Batt}$.

Thermal Model:

It is particularly advantageous to take a thermal model into account because the EC parameters relate to the cell temperatures, although it is only possible to measure the surface temperatures thereof.

Figure 4:
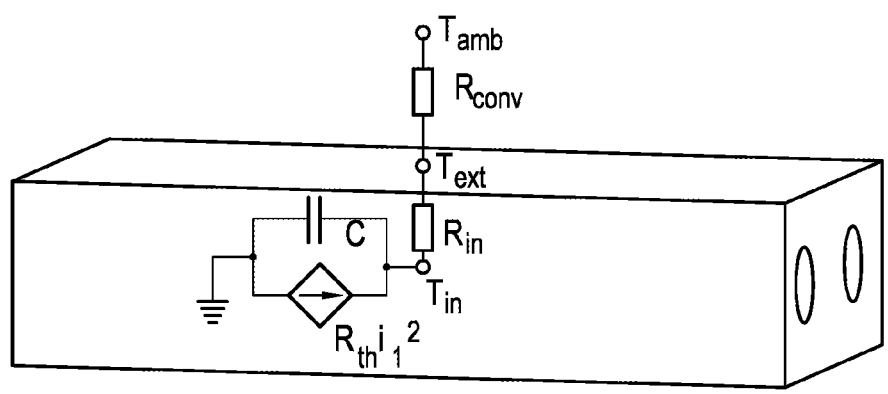
FIG. 4 shows an exemplary embodiment of a thermal model.

The simplified thermal model that is used (see FIG. 4), assumes that the heat resulting from the voltage drop through the internal resistance is generated at a point in the middle of the cell.

$$\dot{Q}_{Inr} = R_{ges} * I_{Batt}^2$$

An increase in the core temperature can be described as a function of the thermal capacity $c_{Li}$ and the ground $m_{cell}$ for the cell.

$$\Delta T_{Inr} = \int (\dot{Q}_{Inr} - \dot{Q}_{cond}) * c_{Li} * m_{Cell}$$

This results in a thermal current $\dot{Q}_{cond}$ to the surface, which increases the surface temperature and reduces the core temperature.

$$\Delta T_{Surf} = \int (\dot{Q}_{cond} - \dot{Q}_{rad} - \dot{Q}_{conv}) * c_{Surf} * m_{Surf}$$

The cell then releases heat into the environment through convection $\dot{Q}_{conv}$ and radiation $\dot{Q}_{rad}$.

The inner resistance between the cells and the vehicle battery, resulting from wiring and soldering for example, can also be taken into account in the basic battery model GM.

Because a vehicle battery for an electric automobile, for example, can contain as many as 188 cells connected in series, a cell model is selected as the basis for obtaining the parameters for the basic battery model GM in the first exemplary embodiment. To obtain the vehicle-specific battery model FM, values based on the measurements of individual cells in the vehicle battery are assigned to the battery parameters for the basic battery model GM in the first exemplary embodiment. The cell voltages and/or cell currents in individual cells are measured for this, and subsequently extrapolated for the vehicle battery.

This measurement of individual cells takes place in a cell test in the first exemplary embodiment, which comprises the following cycles:
  one cycle for identifying the open-circuit voltage $OCV_{cell}$, during which the vehicle battery is slowly charged and discharged at 25° C. with C/20,
  cycles for identifying the thermal model and validating the overall model, in which an HPPC cycle (Hybrid Pulse Power Characterization) is carried out at various temperatures, e.g. −10° C., 0° C., 10° C., 25° C., and 45° C.,
  a simulated driving cycle for identifying the EC parameter, which is carried out at various temperatures, e.g. −10° C., 0° C., 10° C., 25° C., and 45° C.

Capacity OCV:

The capacity or OCV cycle is used to measure the capacity and determine the open-circuit voltage $OCV_{cell}$ in the cell. This has advantages because the capacities of the cells are subject to a strong serial dispersion, and the value from the data sheet only represents a minimum value. The capacity must be determined precisely in order to determine the open-circuit voltage $OCV_{cell}$ for the cell.

This cycle is described by the following characteristics:
The cell is fully discharged (0% SoC or min. cell voltage according to the data sheet, also referred to as final discharge voltage). The charging starts at a constant C-rate, until the cell is full charged. This is referred to as the constant current (CC) phase. At this point, the constant voltage phase (CV) begins, in which the voltage is maintained at the final charging voltage level until the charging current falls below a threshold of 0.025 C. This is followed by a resting period of one hour, in which the cell recovers and cools off. Discharge then begins at the same C-rate as during the charging phase, until a final discharge voltage level is reached. The CV phase then starts over until the discharge current falls below 0.025 C. This cycle is repeated numerous times, varying the C-rate between 0.1-1 C, and the temperature between −10° C. and 40° C.

Figure 5:
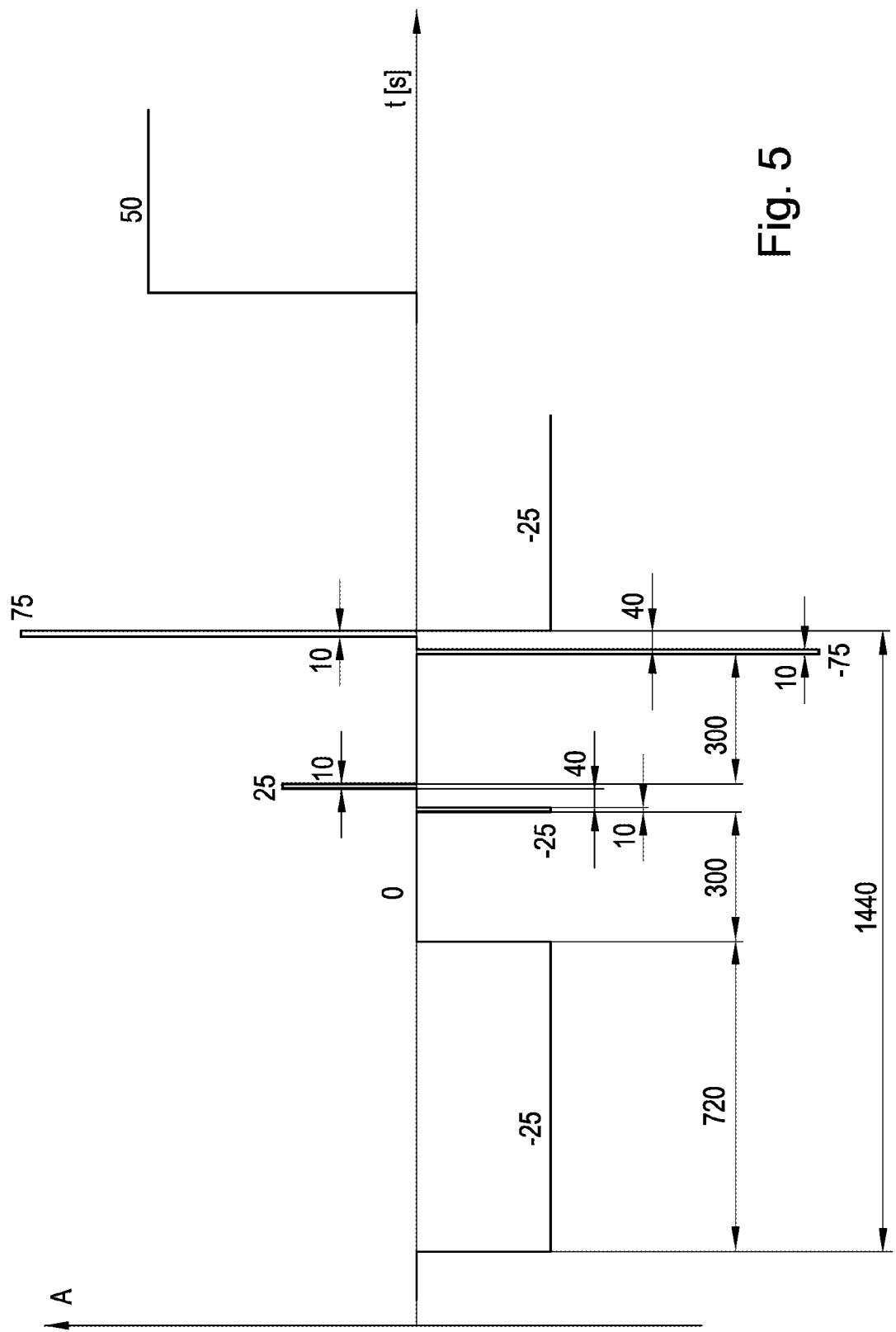
FIG. 5 shows an exemplary diagram of an HPPC cycle.

HPPC and GITT:

The HPPC cycle is an expansion of the GITT cycle (Galvanostatic Intermittent Titration Technique) with which pulsed charging and discharging take place. The pulses have different amplitudes and alternating polarities in the HPPC cycle. FIG. 5 shows an exemplary graph of such an HPPC cycle.

The HPPC cycle is used to check the parameters identified in the driving cycles for plausibility. To use the HPPC cycle to identify the thermal relationship of the parameter and verify the thermal model, a break lasting numerous hours is taken between the individual HPPC steps so that the cell can cool back down to the ambient temperature.

Driving Cycle:

It is possible to superimpose a real driving cycle from a database on a random cell being tested in the driving cycle test. Because of the high dynamics in the current signal, the best means of identifying the EC parameter in this cycle is through the use of least squares algorithms.

These cycles are used on individual cells or cell packs used in various electric automobiles to identify values for the battery parameters in the basic battery model GM. These values for the individual cells or cell packs are upscaled to the vehicle battery based on the connections between the individual cells in the vehicle to obtain a vehicle-specific battery model FM for the type of vehicle in question. To account for the serial dispersion of the cells, these cell tests are carried out on numerous cells of the same type.

Figure 6:
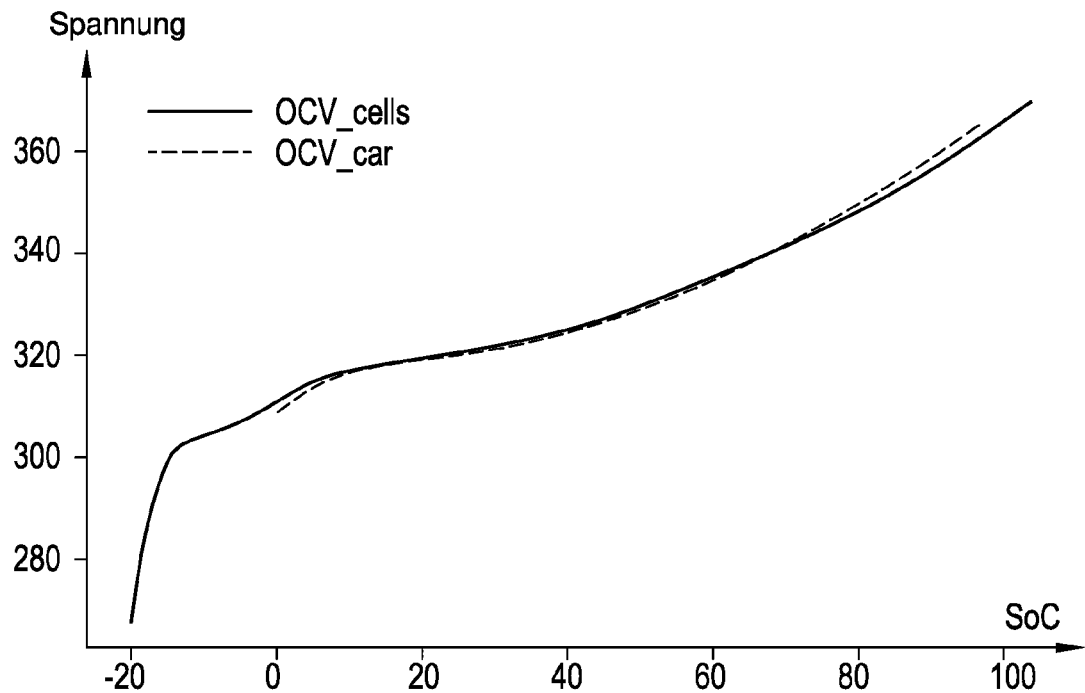
FIG. 6 shows an exemplary graph of the open-circuit voltage curve for individual cells and the vehicle battery.

This scaling is shown in FIG. 6 using the open-circuit voltage OCV, by way of example. The open-circuit voltage curve $OCV_{cell}$ for a first cell measurement in the laboratory and the open-circuit voltage curve $OCV_{car}$ for the vehicle battery in the vehicle are shown in FIG. 6. The open-circuit voltage curves, $OCV_{cell}$ for the cell and $OCV_{car}$ for the vehicle battery, are the same in the middle.

Vehicle-Specific Battery Model FM:

The values assigned to battery parameters in the basic battery model GM are age- and temperature-dependent. For this reason, the values assigned to the battery parameters in the basic battery model GM are subsequently adjusted on the basis of the battery parameters determined while the battery is connected to a load, thus obtaining the vehicle-specific battery model FM. The values assigned to the battery parameters in the basic battery model GM are adjusted in this case on the basis of the cell temperature, and/or the state of charge, and/or the aging of the vehicle battery.

The values first assigned to the battery parameters for the basic battery model GM can be determined by using the battery in a test drive with a vehicle, for example, and then adjusted to the temperature using reference tables. By this means, it is possible to obtain a digital mapping of the vehicle battery after a short test drive while also obtaining values for the internal resistance $R_0$, in order to be able to subsequently draw conclusions regarding the state of the vehicle battery.

The vehicle battery can be used in a test drive with the vehicle until the battery is fully discharged. For this, the vehicle battery is first fully charged, and then fully discharged during the test drive.

The data transfer unit described above is connected to the vehicle during this test drive. By this means, measured values for the following parameters: battery pack current, battery pack voltage, battery module temperature, state of charge SoC, ambient temperature, and cell voltages, can then be sent to the data storage unit or server.

After completion of the test drive, the acquired data are smoothed and synchronized, thus forming a basis for the adjustment of the values assigned to the battery parameters in the basic battery model GM. An identification algorithm such as that described above in the section "Identification of EC Parameters" is used to estimate the values for the battery parameters in the basic battery model GM.

The values for the battery parameters in the basic battery model GM determined in this manner, on the basis of the ambient temperature during the test drive, are therefore valid for the state of charge range and the cell temperature during the test drive. Because these model parameter values are heavily dependent on the temperature and state of charge, the subsequent standardization is advantageous. The estimated values for the battery parameters in the basic battery model GM are then standardized on the basis of the basic battery model GM established with the cell tests and standardized to 25° C., because the measurement could take place under various environmental conditions, standardization to normal conditions is advantageous. The vehicle-specific battery model FM is obtained in this manner.

With this exemplary embodiment, the testing period is substantially shorter than with a test drive that fully discharges the battery, e.g. 30 minutes, during which the battery is partially discharged, and the battery parameters obtained during this partial-discharge test drive are then extrapolated from historical data and/or laboratory data to the fully discharged state.

As with the test drive in which the battery is fully discharged, the values for the battery parameters in the basic battery model GM estimated with the partial-discharge test drive, which are established with cell tests and standardized to 25° C., are also subsequently extrapolated for the entire possible state of charge range of 0% to 100%, and the vehicle-specific battery model FM is obtained in this manner.

The testing period can also be substantially shortened by discharging the battery after the battery has been charged using a predefined charging model.

The charging model comprises phases of an inverted driving cycle (EC parameter determination) and phases of an HPPC cycle (EC parameter verification), depending on the vehicle. The battery is charged ca. 20% as quickly as possible for this. There are resting periods of ca. 30 minutes at the start and end of each cycle, during which the open-circuit voltage OCV is measured. The state of charge at the start of the test is preferably in a range of 30-60%.

With the special charging model, with which it is possible to accurately identify the EC parameter values, it is possible to extrapolate the entire range of the state of charge after a short charging of only a small percentage, by which means it is possible to determine the battery's state of health SoH.

Determining the State of Health SoH:

A complete charging and complete discharging can be simulated with the vehicle-specific battery model FM in order to determine the capacity of the vehicle battery or its state of health SoH.

Figure 7:
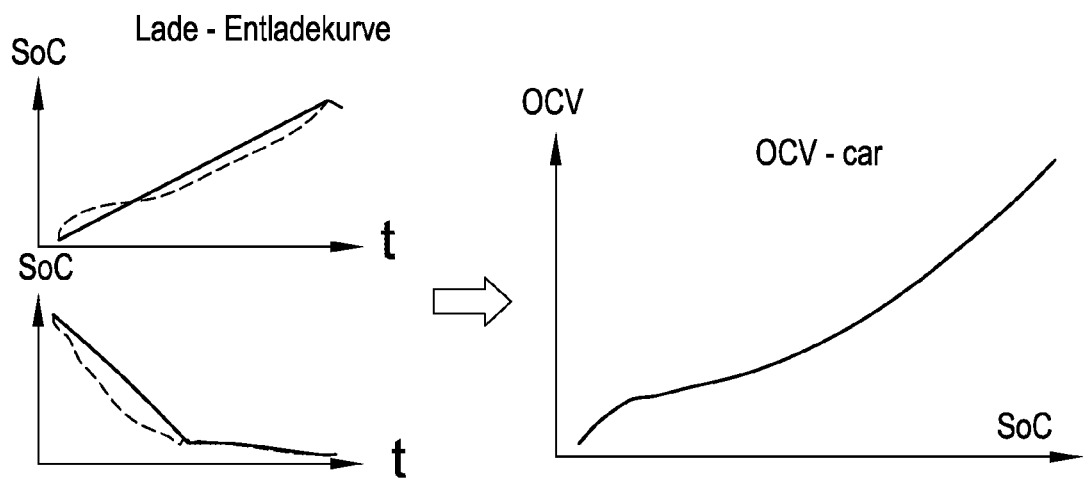
FIG. 7 shows exemplary embodiment of the calculation of the open-circuit voltage curve from charge and discharge curves.

Because the vehicle-specific battery model FM accurately reflects the actual battery, the open-circuit voltage $OCV_{car}$ can be calculated while the battery is in use. When the relationship between the open-circuit voltage $OCV_{cell}$ and the state of charge of individual cells in the vehicle battery, i.e. the open-circuit voltage charging curves for the cells, are known, it is possible to determine the battery's current state of charge SoC (see FIG. 7).

Figure 2:
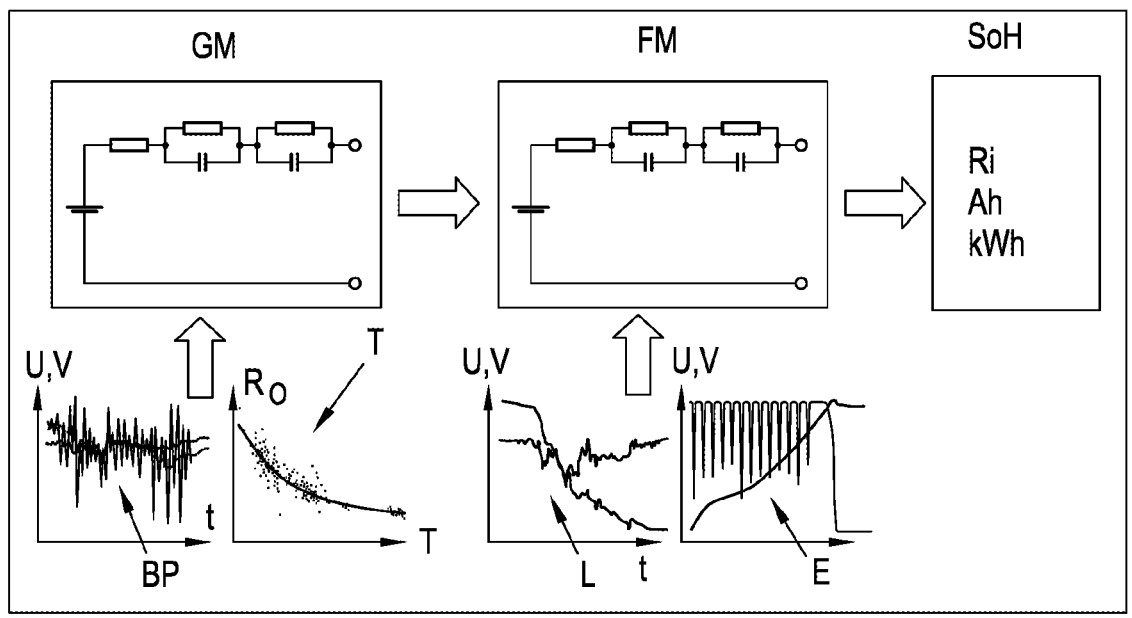
FIG. 2 shows a schematic illustration of how a vehicle-specific battery model is created.

This makes it possible to determine the vehicle battery's state of health SoH, even if only a portion of the charging L or discharging E has been plotted (see FIG. 2). This takes place in the exemplary embodiment in that the fully discharged and fully charged states are extrapolated from the change in the state of charge using a Coulomb counter. The Coulomb counter measures the charge and subtracts the amount of charge discharged therefrom in order to determine the capacity.

A Worldwide harmonized Light vehicles Test Procedure (WLPT) cycle is simulated using the standardized and potentially extrapolated vehicle-specific battery model FM in the exemplary embodiment. A current with a predefined current profile adapted to the vehicle is applied to the model for this. The power discharged from the battery during the WLPT cycle is calculated from the simulation and compared with the nominal power for the vehicle in order to calculate the state of health SoH.

It is also possible to estimate the distance the vehicle can travel with the current state of health SoH of the vehicle battery when the WLTP cycle is applied to the vehicle-specific battery model.

The predefined charging model is particularly advantageous for calculating the state of health SoH of another battery system, e.g. in an aircraft of stationary power storage system, instead of using test drives or flights.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

The invention claimed is:

1. A method for determining a vehicle battery's state of health in an electric or hybrid vehicle, comprising the following steps:
   connecting the vehicle battery to a load and determining values for predefined battery parameters, in particular the battery pack voltage, battery pack current, cell voltage, battery module temperature, and/or state of charge, preferably with the battery management system in the vehicle while the battery is in use,
   sending these parameter values to a data storage unit, in particular outside the vehicle, preferably in realtime, in particular by means of a data transfer unit that can be plugged into a diagnosis socket in the vehicle, and
   calculating the vehicle battery's state of health on a server connected to the data storage unit for data transfer based on the obtained battery parameter values, using a vehicle-specific battery model,
   characterized in that a basic battery model in the form of an equivalent circuit model relating to the type of vehicle battery is initially used for the basis of the vehicle-specific battery model, wherein the basic battery model comprises a power source, an internal resistance, and a number of RC circuits, in particular two,
   wherein the internal resistance and the RC circuits reflect the cell temperature and the state of charge,
   wherein the open-circuit voltage is a function of the state of charge, and
   wherein the cell temperature is determined using a thermal model based on the measured battery pack current, EC parameters, in particular the parameters for the equivalent circuit model, the battery module temperature, and the ambient temperature.

2. The method according to claim 1, characterized in that values are assigned, in particular in advance, to the battery parameters for the basic battery model on the basis of the measurement of individual cells in the vehicle battery, in particular the measurements of the cell voltages and/or cell currents in individual cells, wherein the open-circuit voltage for at least one individual cell, preferably numerous individual cells, is determined, and the open-circuit voltage for the vehicle battery is estimated on the basis of the open-circuit voltage determined for the individual cells.

3. The method according to claim 1, characterized in that the values assigned to the battery parameters for the basic battery model are adjusted on the basis of the battery parameters determined while the vehicle battery is connected to a load, and the vehicle-specific battery model is obtained in this manner.

4. The method according to claim 1, characterized in that the values assigned to the battery parameters for the basic battery model are adjusted on the basis of the cell temperature and/or state of charge and/or aging of the vehicle battery while the battery is connected to a load.

5. The method according to claim 4, characterized in that
   the vehicle battery is connected to a load by test-driving the vehicle,
   valid values are determined for the battery parameters of the basic battery model for the state of charge and cell temperature during the test drive, and
   the values determined in this manner are standardized to a predefined temperature, in particular 25° C., using the values determined, in particular according to claim 3, on the basis of the measurement of individual cells in the vehicle battery, and extrapolated to a predefined state of charge range, in particular from 0 to 100%, to obtain the vehicle-specific battery model.

6. The method according to claim 1, characterized in that the internal resistances between the cells in the vehicle battery, caused in particular by the wiring and/or soldering, are accounted for in the basic battery model and/or in the vehicle-specific battery model.

7. The method according to claim 1 characterized in that the vehicle-specific battery model undergoes a predefined testing cycle, in particular a WLTP cycle, and the distance the vehicle can travel with the current vehicle battery's state of health is estimated, wherein, in particular, the vehicle-specific battery model is supplied with current in accordance with a predefined current profile.

8. The method according to claim 1, characterized in that the vehicle battery is drained by test-driving the vehicle until the fully charged battery is fully discharged.

9. The method according to a claim 1, characterized in that the vehicle battery is discharged by
   charging the vehicle battery with a predefined charging model, and/or
   partially discharging the battery in a test drive, and the battery parameter values obtained during the test drive are extrapolated to the fully discharged state using historical data and/or laboratory data.

10. The method according to claim 1, characterized in that the open-circuit voltage of the vehicle battery is calculated using known EC parameters based on the vehicle-specific battery model while connected to a load until reaching a testing state,
    wherein the relationship between the open-circuit voltage and the state of charge of individual cells in the vehicle battery, in particular the open-circuit voltage state of charge curve, is predefined,
    wherein the current state of charge of the vehicle battery is determined based on the open-circuit voltage, and
    wherein the vehicle battery's state of health is determined by extrapolating to the fully discharged state or fully charged state by means of a Coulomb counter and the corresponding change in the state of charge.

11. The method according to claim 1, characterized in that the vehicle battery's state of health is calculated after the battery has been discharged and the battery parameter values obtained while the battery was in use have been sent to the data storage unit.

12. The method according to claim 1, characterized in that the battery parameter values sent to the data storage unit undergo data processing, in particular smoothing, and/or synchronizing, and/or resampling.

13. A system for determining a vehicle battery's state of health in an electric or hybrid vehicle, in particular for executing the method according to claim 1, comprising:

a separate data storage unit, in particular outside the vehicle, a data transfer unit that can be plugged into a diagnosis socket in the vehicle, with which values for predefined battery parameters that have preferably been determined by the battery management system in the vehicle while the vehicle battery was in use can be sent to the data storage unit, and a server connected to the data storage unit for data communication, with which the vehicle battery's state of health can be calculated based on the battery parameters using a vehicle-specific battery model, wherein the server can select the battery model based on the type of vehicle battery characterized in that the server is designed to initially use a basic battery model in the form of an equivalent circuit model relating to the type of vehicle battery as the basis for the vehicle-specific battery model, wherein the basic battery model comprises a power source, an internal resistance, and a number of RC circuits, in particular two, wherein the internal resistance and the RC circuits reflect the cell temperature and the state of charge, wherein the open-circuit voltage is a function of the state of charge, and wherein the cell temperature is determined using a thermal model based on the measured battery pack current, EC parameters, in particular the parameters for the equivalent circuit model, the battery module temperature, and the ambient temperature.

* * * * *